United States Patent [19]

Norris

[11] Patent Number: 5,630,148
[45] Date of Patent: May 13, 1997

[54] DYNAMIC PROCESSOR PERFORMANCE AND POWER MANAGEMENT IN A COMPUTER SYSTEM

[75] Inventor: David Norris, Portland, Oreg.

[73] Assignee: Intel Corporation, Santa Clara, Calif.

[21] Appl. No.: 613,778

[22] Filed: Feb. 28, 1996

Related U.S. Application Data

[63] Continuation of Ser. No. 261,457, Jun. 17, 1994, abandoned.
[51] Int. Cl.⁶ .................................................. G06F 13/00
[52] U.S. Cl. ............................................ 395/750; 395/348
[58] Field of Search .............................. 395/750, 159; 364/707

[56] References Cited

U.S. PATENT DOCUMENTS 4,775,935 10/1988 Yourick ............................ 364/401
5,086,387 2/1992 Arroyo et al. ..................... 395/550
5,142,684 8/1992 Perry et al. ........................ 395/750
5,230,074 7/1993 Canova, Jr. et al. ............... 395/750
5,292,341 3/1994 Snell .................................. 607/30

*Primary Examiner*—Jack B. Harvey
*Assistant Examiner*—John Travis
*Attorney, Agent, or Firm*—Blakely, Sokoloff, Taylor & Zafman

[57] ABSTRACT

A computer system is disclosed comprising a clock generator circuit having a clock speed register and circuitry for generating a processor clock signal at a frequency determined by the clock speed register, wherein the processor executes a performance manager program that writes the clock speed register according to a performance state selected by an application program. The application program selects the performance state to maximize performance during processor intensive functions and to maximize power conservation during interactive functions.

15 Claims, 6 Drawing Sheets

DYNAMIC PROCESSOR PERFORMANCE AND POWER MANAGEMENT IN A COMPUTER SYSTEM

This is a continuation of application Ser. No. 08/261,457 filed Jun. 17, 1994, now abandoned.

BACKGROUND OF THE INVENTION

1. Field of the Invention

The present invention pertains to the field of computer systems. More particularly, this invention relates to the dynamic management of processor performance and power consumption in a portable computer system.

2. Background

Recent portable computer systems such as laptop computers and palmtop computers typically contain a central processing unit and a variety of input/output devices such as a keyboard, a display device, and mass storage devices. Typically, such a portable computer system includes a battery subsystem that provides power to the computer system while alternating current power is not available. Such a battery subsystem is typically capable of supplying a limited amount of electrical current to the computer system before requiring a recharge or replacement.

Such a prior portable computer system typically provides a variety of mechanisms for minimizing the electrical current consumption in the computer system. For example, such systems usually implement sleep modes and standby modes for the input/output devices that reduce electrical current consumption while the input/output devices are not in use. In addition such prior systems typically provide a clock speed control mechanism for the central processing unit.

Typically, the central processing unit in such a system consumes less electrical current at lower processor clock speeds. Unfortunately, such lower power consumption is typically achieved at the expense of performance by the central processing unit. The instruction throughput of such a central processing unit usually decreases in proportion to the decrease in the processor clock speed. As a consequence, the user of such a prior portable computer system must typically choose between a high performance, high power consumption state for the computer system or a low performance, low power consumption state for the computer system.

The consequences of slower processor clock speeds in such a computer system depends upon the function being performed by the executing program. The user typically does not perceive a significant reduction in performance during interactive functions while the processor is running at a slow clock speed. However, the user does perceive a significant degradation in performance during processor intensive functions at a slow clock speed. Such processor intensive functions are also referred to as processor bound functions.

For example, the user typically does not perceive a significant degradation in performance if the processor is set in a slow clock speed during interactive data entry and typing functions in a word processing application program. However, the user does perceive a significant degradation in performance during processor bound functions such as the reformatting of pages, the rendering data to a printer, the drawing complex diagrams or the reindexing data bases.

In such a prior system, the user may select a maximum performance level by setting the processor clock speed to a high frequency. In such a maximum performance mode, the user perceives maximum performance during processor bound functions. Unfortunately, the user typically experiences a significantly reduced battery life in such a high performance mode.

On the other hand, the user may select a maximum conservation mode by setting the processor clock speed to a low frequency. In such a conservation mode, the user typically experiences extended battery life without a perceivable degradation in performance during interactive functions. Unfortunately, the user perceives significant degradation in performance during processor bound functions in such a maximum conservation mode.

In some prior portable computer systems, the user typically selects a desired processor clock speed using a function key sequence or a control panel graphical select function. Some prior portable computer systems allow the user to set the processor clock speed at any time without restarting the computer system. Nevertheless, such typical prior processor clock speed control mechanisms are too cumbersome to provide the user with any useful control over the balance between processor performance and system power consumption.

SUMMARY AND OBJECTS OF THE INVENTION

One object of the present invention is manage a balance between performance and power consumption in a computer system.

Another object of the present invention is to enable application programs in a computer system to select high performance modes of a processor during processor intensive functions.

Another object of the present invention is to enable application programs in a computer system to select power conservation modes of a processor during non processor intensive functions.

A further object of the present invention is enable a computer system user to select processor clock frequencies for a set of performance modes of a processor.

Another object of the present invention is to provide an accelerate button graphical interface that enables a user to increase the processor clock frequency during processor intensive functions.

These and other objects of the invention are provided by a computer system comprising a clock generator circuit having a clock speed register and circuitry for generating a processor clock signal at a frequency determined by the clock speed register. The computer system further comprises a processor coupled to receive the processor clock signal to synchronize the processor. The processor executes a performance manager program that writes the clock speed register according to a performance state selected by an application program executing on the computer system.

The processor writes the clock speed register with a value specified in a performance state table maintained by the performance manager program. The performance state table stores a set of clock frequencies that correspond to a set of performance states for the processor.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
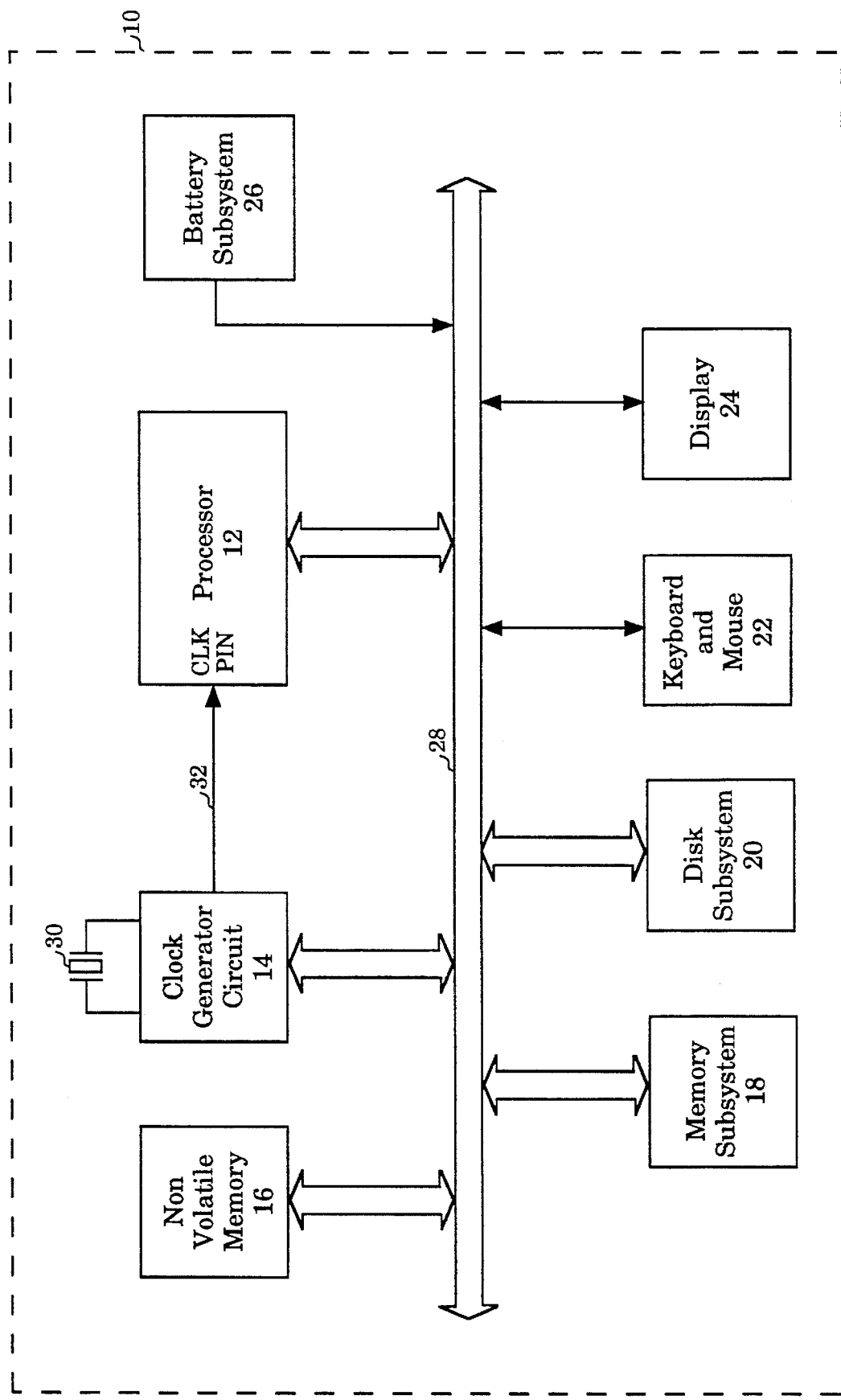
FIG. 1 illustrates a computer system for one embodiment which comprises a processor, a clock generator circuit, a non-volatile memory, and a memory subsystem.

FIG. 1 illustrates a computer system 10 for one embodiment. The computer system 10 comprises a processor 12, a clock generator circuit 14, a non-volatile memory 16, and a memory subsystem 18. The computer system 10 further comprises a set of input/output devices including a disk subsystem 20, a keyboard and mouse subsystem 22, and a display 24.

The processor 12 communicates with the non-volatile memory 16, the memory subsystem 18, the disk subsystem 20, the keyboard and mouse 22, and the display 24 via a system bus 28. The computer system 10 further comprises a battery subsystem 26. The battery subsystem 26 supplies an electrical direct current to the computer system 10 via a set of power lines of the system bus 28.

The non-volatile memory 16 provides a storage area for a basic input/output software (BIOS) for the computer system 10. The BIOS of the computer system 10 includes basic driver routines for controlling hardware functions of the disk subsystem 20, the keyboard and mouse 22, and the display 24. In addition, the BIOS of the computer system 10 includes a set of driver routines for accessing a clock speed register in the clock generator circuit 14.

The memory subsystem 18 provides storage areas for an operating system, application programs, and device driver programs and other associated data structures for the computer system 10. For one embodiment, the memory subsystem 18 comprises a dynamic random access (DRAM) memory subsystem.

The disk subsystem 20 provides large scale mass storage to the computer system 10 for programs and data. The keyboard and mouse subsystem 22 enables user interaction with the computer system 10. The display 24 provides display functions for the computer system 10.

The clock generator circuit 14 generates a processor clock 32 for the processor 12. The processor clock 32 is coupled to a clock input pin (CLK PIN) of the processor 12. The processor clock 32 synchronizes the processor 12. The frequency of the processor clock 32 determines the rate at which the processor 12 fetches and executes instructions.

The processor 12 fetches an instruction stream from the memory subsystem 18 over the system bus 28. The processor 12 executes each instruction in the instruction stream. The processor 12 maintains data structures in the memory subsystem 18 according to the application programs, the device driver programs, and operating system being executed.

The clock generator circuit 14 is coupled to a crystal device 30. The crystal device 30 enables generation of the processor clock 32 according to the contents of a clock speed register contained in the clock generator circuit 14. The processor 12 controls the frequency of the processor clock 32 by writing to the clock speed register in the clock generator circuit 14 over the system bus 28.

The crystal device 30 oscillates at a fixed predetermined frequency when electrical current is applied. The clock generator circuit 14 adjusts the frequency of an oscillating signal generated by the crystal device 30 according to the contents of the clock speed register. For one embodiment, the processor 12 writes to the clock speed register to divide the frequency of the oscillating signal generated by the crystal device 30 by one, two, four, or eight. The processor 12 also writes to the clock speed register to stop the processor clock 32.

Figure 2:
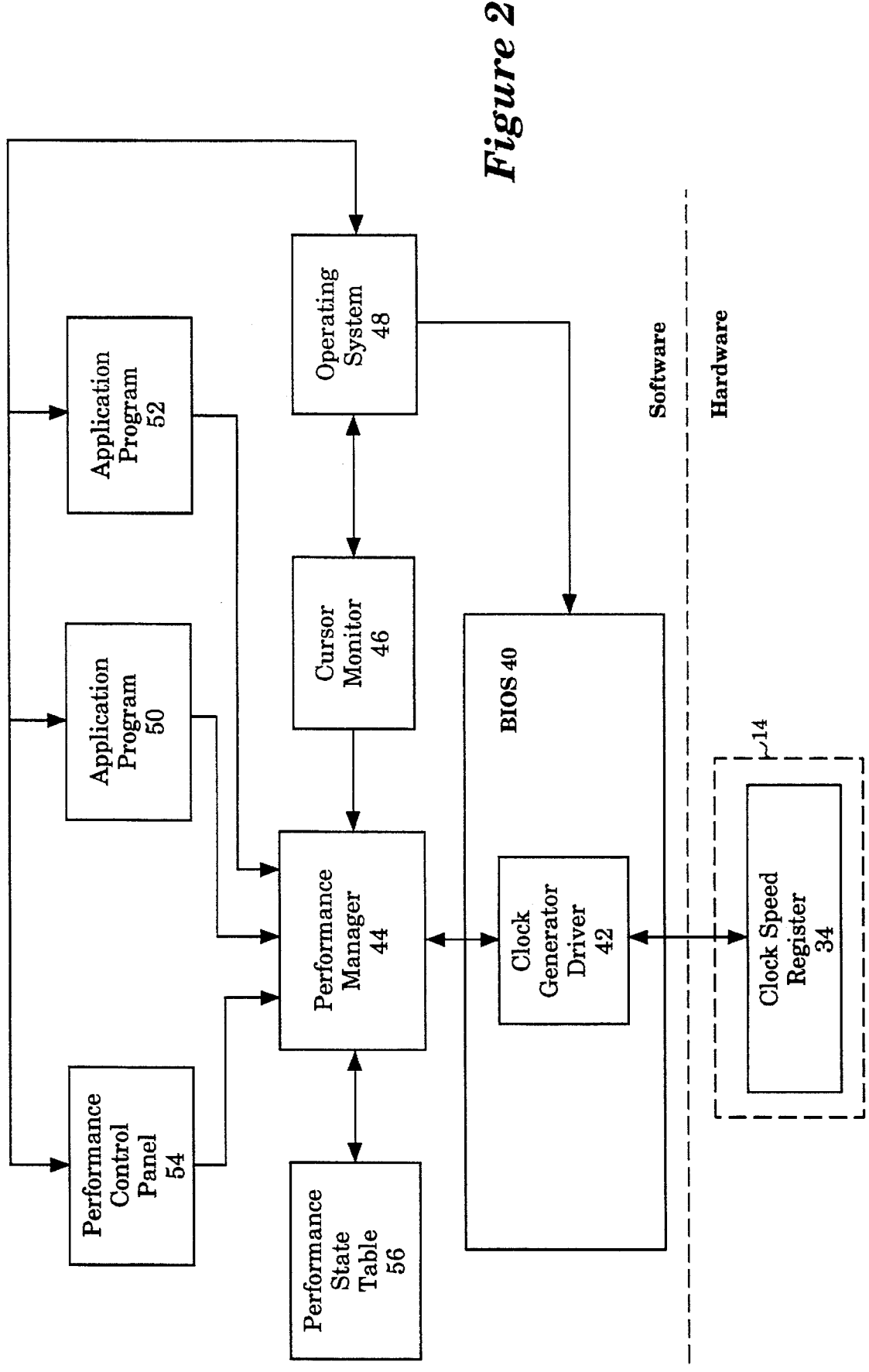
FIG. 2 is a block diagram that illustrates the software architecture of the computer system for one embodiment which includes a performance manager, an operating system, and a set of application programs.

FIG. 2 is a block diagram that illustrates the software architecture of the computer system 10 for one embodiment. The software implemented on the computer system 10 includes an operating system 48, and a set of application programs such as a pair of application programs 50 and 52 and associated device driver programs. The software architecture of the computer system 10 also includes a set of basic input/output software (BIOS) 40.

The operating system 48 and the application programs 50 and 52 and associated device drivers are loaded from the disk subsystem 20 and are executed from the memory subsystem 18. For one embodiment, the operating system 48 is Microsoft Windows.

The operating system 48 provides a set of system services to the application programs 50 and 52 including memory management and multi tasking functions. The operating system 48 enables the application programs 50 and 52 and associated device driver programs to access the input/output devices of the computer system 10 through the BIOS 40.

The BIOS 40 includes basic hardware driver routines for accessing and controlling the disk subsystem 20, the keyboard and mouse 22, and the display 24. The BIOS 40 also includes a clock generator driver 42. The clock generator driver 42 comprises a set of hardware driver routines for accessing a clock speed register 34 in the clock generator circuit 14.

The software architecture of the computer system 10 further comprises a performance manager 44, a performance control panel 54, and a performance state table 56. For one embodiment, the performance manager 44 is an extension of the operating system 48 that is loaded from the disk subsystem 20 and executed from the memory subsystem 18. The performance manager 44 processes requests from the application programs 50 and 52 to change the performance state for the processor 12.

For one embodiment, the application programs 50 and 52 execute a set_performance_state system call via the operating system 48 to request changes in the processor performance state by the performance manager 44. The set_performance_state system call to the performance manager 44 specifies either a high performance state, a medium performance state, or low performance state for the processor 12.

The performance manager 44 accesses the performance state table 56 to determine the processor clock 32 frequencies that correspond to the high, medium, and low performance states of the processor 12. The performance manager 44 then invokes the routines of the clock generator driver 42 to program the clock speed register 34 for the specified frequency of the processor clock 32.

For another embodiment, a cursor monitor 46 monitors a cursor generated on the display 24 by the operating system 48 or a cursor generated on the display 24 by one of the application programs 50 and 52. In this embodiment, the cursor monitor 46 monitors a set_cursor system call to the operating system 48 to determine the type of cursor displayed on the display 24. The cursor monitor 46 hooks to the set_cursor system call to detect changes to the cursor display by other application programs or driver programs executing on the processor 12.

A cursor generated on the display 24 in the shape of an hour glass indicates that the processor 12 is executing processor intensive software. The cursor monitor 46 generates a set_performance_state system call to the performance manager 44 to step up the performance state of the processor 12 to the high performance state if the hourglass cursor is being generated on the display 24. The cursor monitor 46 thereafter executes a set_performance_state system call to the performance manager 44 to restore the performance state of the processor 12 to the low performance state after the operating system 48 or the application programs 50 or 52 removes the hourglass cursor from the display 24.

Figure 3A:
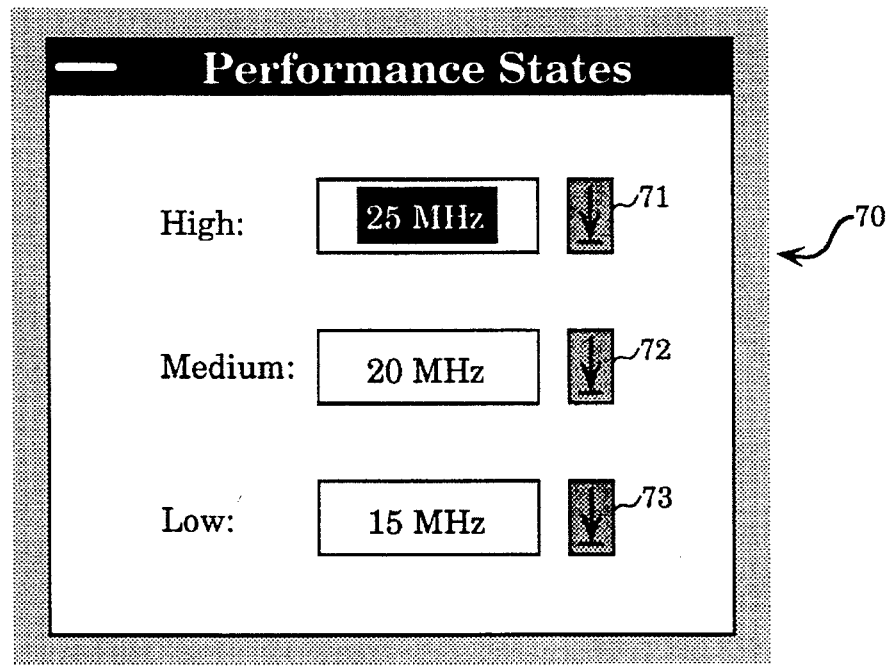
FIGS. 3a–3b illustrate a control panel generated on a display device by a performance control panel which is an application program that enables a user of the computer system to select from a set of predetermined frequencies of the processor clock.
Figure 3B:
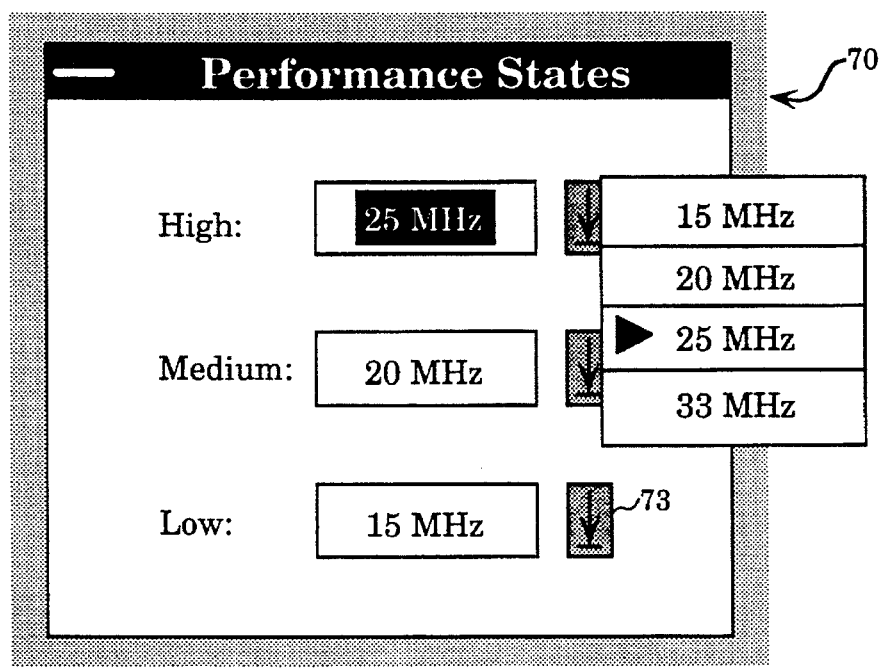

FIGS. 3a–3b illustrate a control panel 70 generated on the display device 24 by the performance control panel 54. The performance control panel 54 is an application program that enables a user of the computer system 10 to select from a set of predetermined frequencies of the processor clock 32 that correspond to the high, medium, and low performance states of the processor 12. The performance control panel 54 employs the display and interactive input functions provided by the operating system 48 to generate the control panel 70 and to enter the processor clock frequencies.

For the example control panel 70 user selection shown in FIG. 3a, the high performance state of the processor 12 corresponds to the processor clock 32 frequency of 25 MHz. The medium performance state corresponds to the processor clock 32 frequency of 20 MHz, and the low performance state corresponds to the processor clock 32 frequency of 15 MHz. The pulldown menu areas 71–73 of the control panel 70 enable the user to select from a set of four predetermined frequencies for the processor clock 32 as shown in FIG. 3b.

For one embodiment, the predetermined frequencies available through the control panel 70 include the oscillation frequency of the crystal device 30, ½ the oscillation frequency of the crystal device 30, ¼ of the oscillation frequency of the crystal device 30, and ⅛ the oscillation frequency of the crystal device 30. The control panel 70 enables the user to select any of the predetermined processor clock 32 frequencies for each of the high, medium, and low processor states.

The user employs a set of pulldown menu areas 71–73 of the control panel 70 to select a desired processor clock 32 frequency for each of the high, medium, and low performance states of the processor 12. If maximum performance for the processor 12 is always desired, then the user selects the fastest processor clock 32 frequency for the high, medium, and low processor states of the processor 12. On the other hand, if conservation of power is always desired, then the user selects the slowest processor clock 32 frequency for the high, medium, and low processor states of the processor 12. In addition, the user can select the processor clock 32 frequencies for the high, medium, and low processor states of the processor 12 to scale the balance between maximum performance and maximum power conservation for the computer system 10 as desired.

The performance control panel 54 transfers the clock speeds selected through the control panel 70 to the performance manager 44. The performance manager 44 then stores the selected clock frequencies for the high, medium, and low performance states in the performance state table 56. The performance manager 44 accesses the clock speeds from the performance state table 56 as set_performance_state system calls are received from the application programs 50 and 52 and the cursor monitor 46. The performance manger 44 then uses the clock generator driver 42 to write the appropriate value into the clock speed register 34 to set the selected processor clock 32 frequency.

For another embodiment, the clock speeds for the performance state table 56 are selected by a clock speed function in the BIOS 40 that enables user selections of clock speeds via command input.

The application programs 50 and 52 generate an information window on the display 24 while executing a processor intensive function. The information window enables the user to accelerate the processor clock 32 frequency during the processor intensive function.

Figure 4:
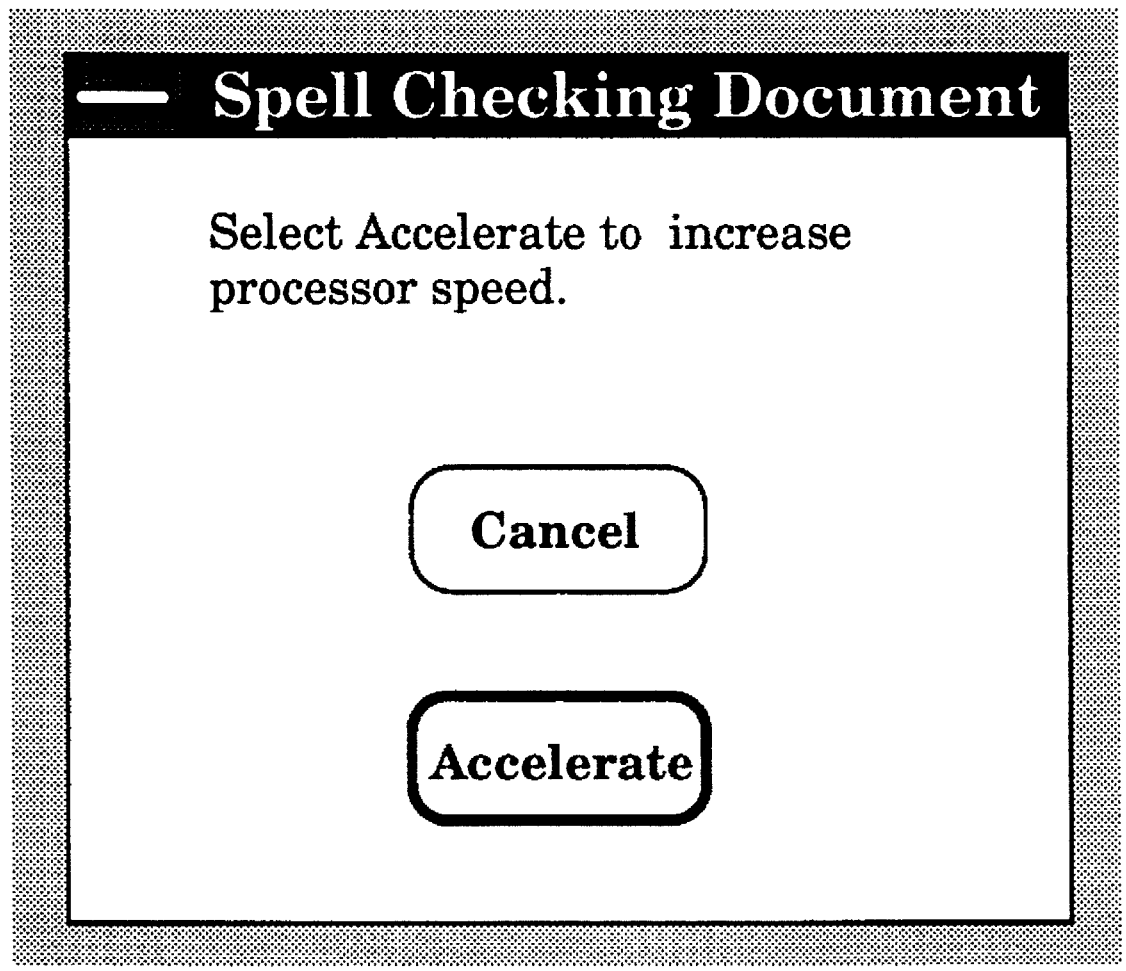
FIG. 4 illustrates an information window for a word processing application program that provides an accelerate button.

FIG. 4 illustrates an information window 80 for one embodiment. The application program 50 is a word processing application program that generates the information window 80 on the display 24 while performing a spell check on a document. The spell check function on a document is an example of a processor intensive function performed by the application program 50.

The information window 80 enables the user to accelerate the spell check function by selecting the accelerate button of the information window 80 using the keyboard and mouse subsystem 22. The information window 80 also enables the user to cancel the spell check function by selecting the cancel button of the information window 80 using the keyboard and mouse subsystem 22.

If the user selects the accelerate button of the information window 80, then the application program 50 executes a set_performance_state system call to the performance manager 44 to step up the performance state of the processor 12 to the high performance state. After completion of the processor intensive spell check function, the application program 50 executes a set_performance_state system call to the performance manager 44 to restore the processor 12 to the low or medium performance state of the processor 12.

Figure 5:
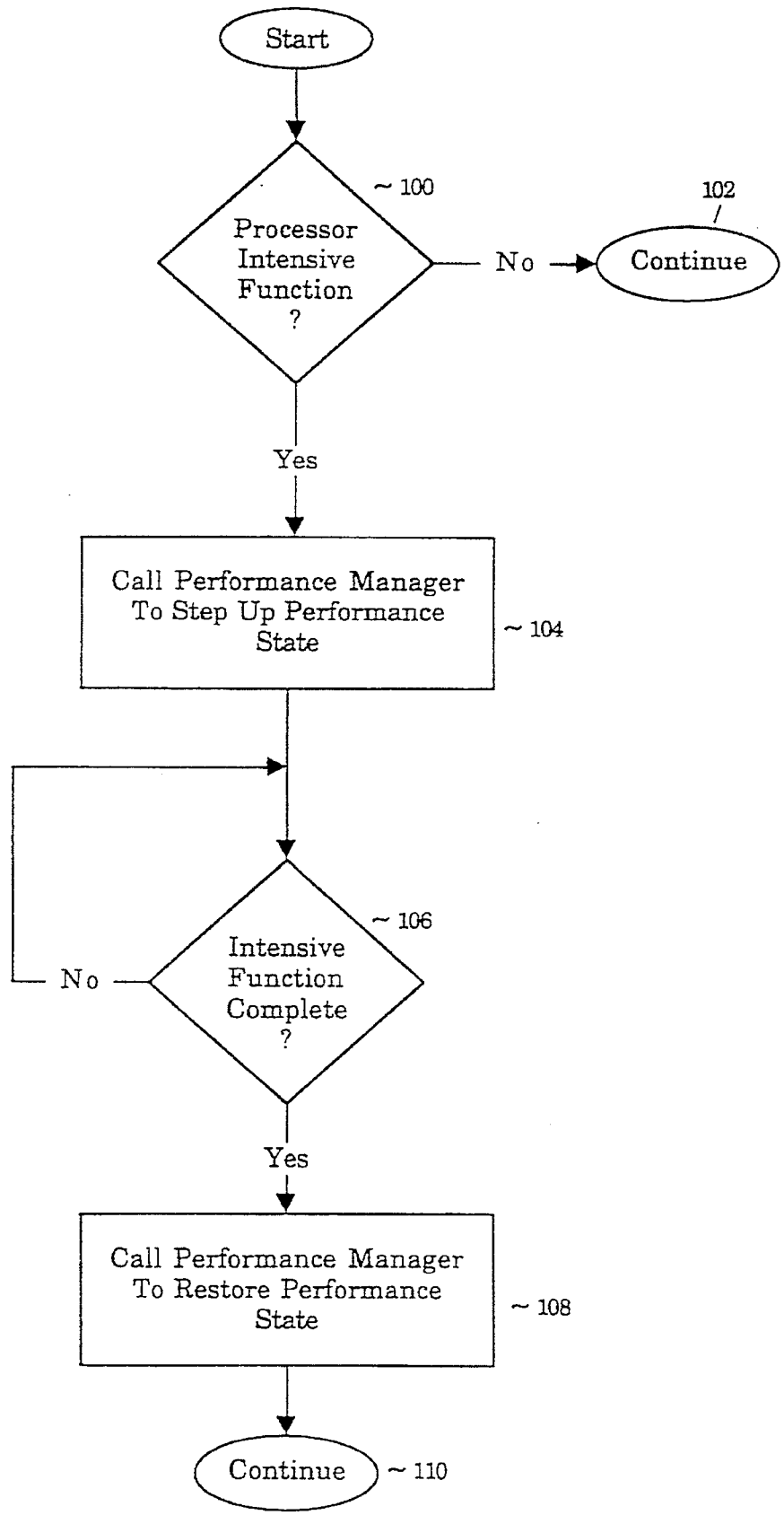
FIG. 5 is a flow diagram that illustrates the handling of the processor performance states by an application program for one embodiment.

FIG. 5 is a flow diagram that illustrates the handling of the processor 12 performance states by the application program 50 for one embodiment. At decision block 100, the application program 50 determines whether the user has initiated a processor intensive function of the application program 50. If a processor intensive function has not been selected at decision block 100, then the application program 50 continues execution at block 102. If a processor intensive function is selected at decision block 100, then control proceeds to block 104.

At block 104, the application program 50 executes a set_performance_state system call to the performance manager 44 to step up the performance state of the processor 12 to the high performance state. Thereafter, the application program 50 performs the processor intensive function specified by the user.

At decision block 106, the application program 50 determines whether the processor intensive function is complete.

If the processor intensive function completes at decision block 106, then control proceeds to block 108. At block 108, the application program 50 executes a set_performance_state system call to the performance manager 44 to restore the performance state of the processor 12 to the low performance state or the medium performance state as required by the application program 50. Thereafter, the application program 50 continues execution at block 110.

Figure 6:
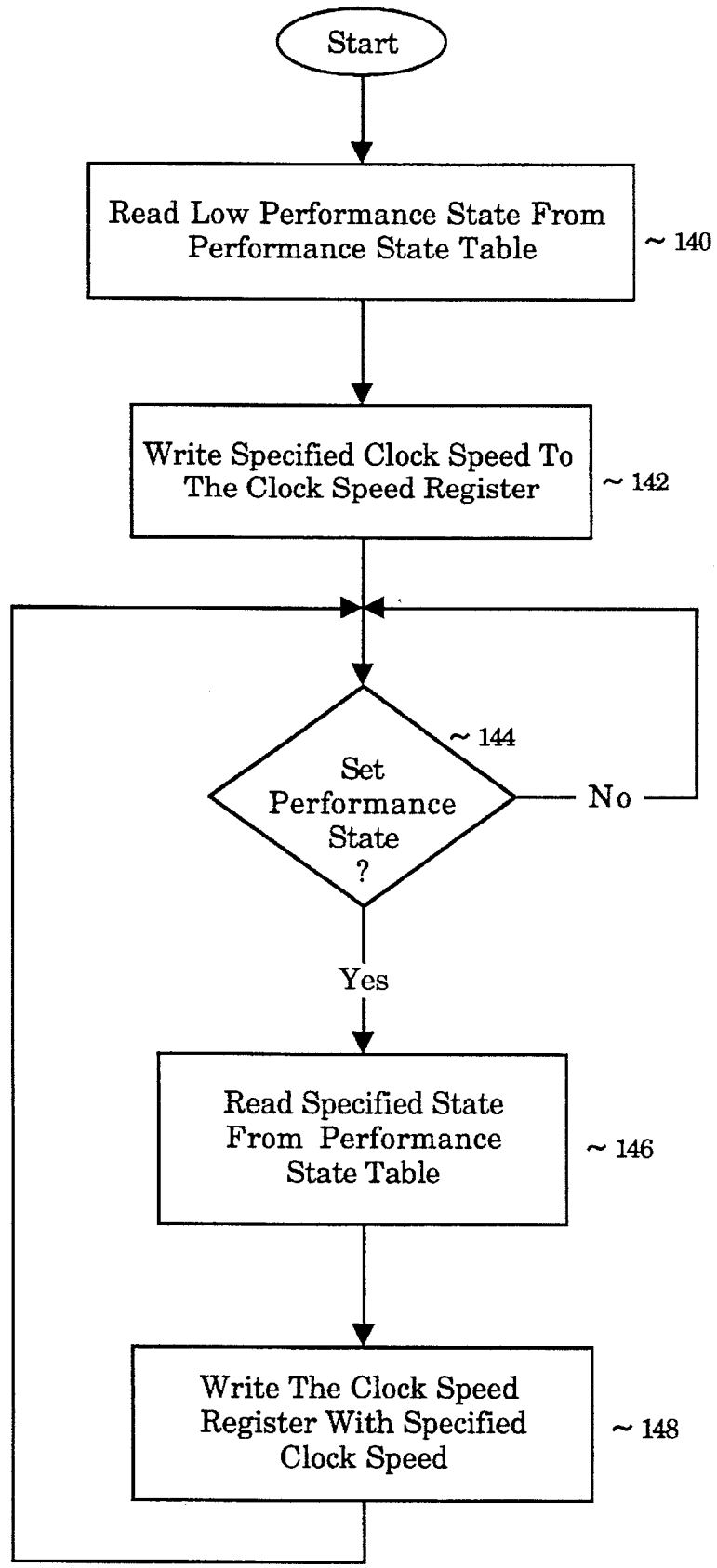
FIG. 6 is a flow diagram that illustrates the functions of the performance manager for one embodiment.

FIG. 6 is a flow diagram that illustrates the functions of the performance manager 44 for one embodiment. At block 140, the performance manager 44 initially reads the clock speed for the low performance state from the performance state table 56. Thereafter at block 142, the performance manager 44 invokes the clock generator driver 42 to write the specified clock speed for the low performance state to the clock speed register 34 of the clock generator circuit 14.

At decision block 144, the performance manager 44 waits for a set_performance_state system call from the application programs 50 and 52 and the cursor monitor 46 to change the performance state of the processor 12. If a set_performance_state system call to the performance manager 44 is received at decision block 144, then control proceeds to block 146.

At block 146 the performance manager 44 reads the clock speed for the performance state specified by the set_performance_state system call from the performance state table 56. Thereafter, at block 148, the performance manager 44 writes the specified clock speed from the performance state table 56 to the clock speed register 34 by invoking the clock generator driver 42. Thereafter, the performance manager 44 returns to decision block 144 to wait for another set_performance_state system call.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A computer system, comprising:

clock generator circuit having a clock speed register and circuitry for generating a processor clock signal at a frequency determined by the clock speed register;

storage means for storing processor instructions;

processor coupled to the clock generator circuit to receive the processor clock signal such that the processor clock signal synchronizes the processor, the processor coupled to the storage means to fetch and execute a performance manager program that writes the clock speed register according to a performance state selected by an application program to be executed by the processor, the performance state having been selected from a performance state table maintained by the performance manager program.

2. The computer system of claim 1, wherein the processor writes the clock speed register with a value specified in a performance state table maintained by the performance manager program.

3. The computer system of claim 2, wherein the performance state table stores a set of clock frequencies that correspond to a set of performance states for the processor.

4. The computer system of claim 3, further comprising a performance control panel program for execution on the computer system that enables a user to select the clock frequencies for the performance states of the processor.

5. The computer system of claim 3, wherein the performance manager program writes the clock speed register with one of the clock frequencies corresponding to a high performance state specified by a system call from the application program as the application program begins a processor intensive function.

6. The computer system of claim 3, wherein the performance manager program writes the clock speed register with one of the clock frequencies corresponding to a low performance state specified by a system call from the application program as the application program ends a processor intensive function.

7. The computer system of claim 3, wherein the performance manager program writes the clock speed register by invoking a clock generator driver program of a set of basic input/output software for the computer system.

8. The computer system of claim 1 wherein the storage means comprises non-volatile memory and a memory subsystem.

9. A method for managing performance and power consumption of a computer system, comprising the steps of:

generating a processor clock signal at a frequency determined by a clock speed register;

synchronizing a processor of the computer system with the processor clock signal;

writing the clock speed register with a value specified in a performance state table maintained by a performance manager program executed by the processor, the value corresponding to a performance state selected by an application program being executed by the processor.

10. The method of claim 9, wherein the performance state table stores a set of clock frequencies that correspond to a set of performance states for the processor.

11. The method of claim 10, further comprising the step of selecting the clock frequencies for the performance states of the processor using a performance control panel program executed on the computer system.

12. The method of claim 11, wherein the step of writing the clock speed register according to a performance state selected by an application program comprises the step of writing the clock speed register with one of the clock frequencies corresponding to a high performance state specified by a system call from the application program as the application program begins a processor intensive function.

13. The method of claim 11, wherein the step of writing the clock speed register according to a performance state selected by an application program comprises the step of writing the clock speed register with one of the clock frequencies corresponding to a low performance state specified by a system call from the application program as the application program ends a processor intensive function.

14. The method of claim 11, wherein the step of writing the clock speed register according to a performance state selected by an application program comprises the step of invoking a clock generator driver program of a set of basic input/output software for the computer system.

15. The method of claim 11, further comprising the step of generating an accelerate button on a display device, such that a user selects the accelerate button to cause the performance manager program to write the clock speed register with one of the clock frequencies corresponding to a high performance state of the processor.

* * * * *